United States Patent
Kindo et al.

[11] Patent Number: 5,565,915
[45] Date of Patent: Oct. 15, 1996

[54] SOLID-STATE IMAGE TAKING APPARATUS INCLUDING PHOTODIODE AND CIRCUIT FOR CONVERTING OUTPUT SIGNAL OF THE PHOTODIODE INTO SIGNAL WHICH VARIES WITH TIME AT VARIATION RATE DEPENDING ON INTENSITY OF LIGHT APPLIED TO THE PHOTODIODE

[75] Inventors: Toshiki Kindo; Takehiko Shida, both of Yokohama, Japan

[73] Assignee: Matsushita Electric Industrial Co., Ltd., Osaka, Japan

[21] Appl. No.: 260,282

[22] Filed: Jun. 14, 1994

[30] Foreign Application Priority Data

Jun. 15, 1993 [JP] Japan ................................ 5-143507

[51] Int. Cl.$^6$ .................................................. H04N 5/335
[52] U.S. Cl. .................................... 348/308; 348/229
[58] Field of Search ................................ 348/229, 230, 348/241, 207, 295, 296, 297, 298, 299, 312, 314, 308, 300, 294, 302; H04N 5/365

[56] References Cited

U.S. PATENT DOCUMENTS

| | | | |
|---|---|---|---|
| 5,027,217 | 6/1991 | Oshio et al. | 348/229 |
| 5,210,612 | 5/1993 | Furuta et al. | 348/295 |
| 5,247,367 | 9/1993 | Lee | 348/298 |

FOREIGN PATENT DOCUMENTS

| | | | |
|---|---|---|---|
| 2-79568 | 3/1990 | Japan | H04N 5/335 |
| 3-192764 | 8/1991 | Japan | H04N 5/335 |
| 4-334283 | 11/1992 | Japan | H04N 5/335 |
| 5-252445 | 9/1993 | Japan | H04N 5/335 |
| 93-14595 | 7/1993 | WIPO | H04N 5/335 |

Primary Examiner—Wendy Garber
Assistant Examiner—Tuan V. Ho
Attorney, Agent, or Firm—Lowe, Price, LeBlanc & Becker

[57] ABSTRACT

A solid-state image taking apparatus includes a photodiode converting incident light into a corresponding signal voltage. A measurement is given of a time until the signal voltage reaches a predetermined reference voltage. The measurement is executed by counting up pulses of a clock pulse signal during the time until the signal voltage reaches the reference voltage. The number of the counted pulses represents the time until the signal voltage reaches the reference voltage. The intensity of the incident light determines the time until the signal voltage reaches the reference voltage. Accordingly, the number of the counted pulses represents the intensity of the incident light.

13 Claims, 6 Drawing Sheets

SOLID-STATE IMAGE TAKING APPARATUS INCLUDING PHOTODIODE AND CIRCUIT FOR CONVERTING OUTPUT SIGNAL OF THE PHOTODIODE INTO SIGNAL WHICH VARIES WITH TIME AT VARIATION RATE DEPENDING ON INTENSITY OF LIGHT APPLIED TO THE PHOTODIODE

BACKGROUND OF THE INVENTION

1. Field of the Invention

This invention relates to a solid-state image taking apparatus which can be used as, for example, a television camera.

2. Description of the Prior Art

Typical CCD (charge-coupled device) image sensors have a two-dimensional array of photodiodes corresponding to pixels respectively. Each of the photodiodes generates signal charges in response to light applied thereto. The amount of signal charges generated by the photodiode varies as a function of the intensity of the applied light. Each of the photodiodes is saturated when the intensity of the applied light exceeds a given level. The dynamic range of such a CCD image sensor is determined by the saturation of the photodiodes.

SUMMARY OF THE INVENTION

It is an object of this invention to provide an improved solidstate image taking apparatus.

A first aspect of this invention provides a soLid-state image taking apparatus comprising a photodiode converting incident Light into a corresponding signal voltage; and means for measuring a time until the signal voltage reaches a predetermined reference voltage; wherein the measuring means comprises means for generating a clock pulse signal, and means for counting up pulses of the clock pulse signal during the time until the signal voltage reaches the reference voltage.

A second aspect of this invention provides a solid-state image taking apparatus comprising a photodiode converting incident light into a corresponding signal voltage; a reset switch connected to the photodiode for removing charges generated by the photodiode; a comparator for comparing the signal voltage with a predetermined reference voltage, and generating a comparison-resultant signal which assumes a high level when the signal voltage is lower than the reference voltage; a first AND circuit receiving the comparisonresultant signal and a clock pulse signal; a second AND circuit receiving a reset pulse signal and an output signal of the first AND circuit; and a counter which counts up pulses in an output signal of the second AND circuit.

A third aspect of this invention provides a solid-state image taking apparatus comprising a photodiode converting incident light into a corresponding signal voltage; means for measuring a time until the signal voltage reaches a predetermined reference voltage; wherein the measuring means comprises means for generating a clock pulse signal, a comparator for comparing the signal voltage with the reference voltage and generating a comparison-resultant signal which represents a result of the comparing, a counter which counts up pulses of the clock pulse signal in response to the comparison-resultant signal; and a memory storing an output signal of the counter.

A fourth aspect of this invention provides a solid-state image taking apparatus comprising a plurality of photodiodes converting incident light into corresponding signal voltages respectively; a plurality of means connected to the photodiodes for measuring times until the signal voltages reach predetermined reference voltages respectively; wherein each of the measuring means comprises means for generating a clock pulse signal, a comparator for comparing the signal voltage with the reference voltage and generating a comparison-resultant signal which represents a result of the comparing, a counter which counts up pulses of the clock pulse signal in response to the comparison-resultant signal; and a plurality of memories storing output signals of the counters respectively.

A fifth aspect of this invention provides a solid-state image taking apparatus comprising a photodiode converting incident light into a corresponding signal voltage; a reset switch connected to the photodiode for removing charges generated by the photodiode; a first comparator for comparing the signal voltage with a predetermined first reference voltage, and generating a first comparison-resultant signal which assumes a high level when the signal voltage is lower than the first reference voltage; a second comparator for comparing the signal voltage with a predetermined second reference voltage lower than the first reference voltage, and generating a second comparison-resultant signal which assumes a high level when the signal voltage is lower than the second reference voltage; a flip-flop circuit responding to the first and second comparison-resultant signals; a first OR circuit receiving a reset pulse signal and the first comparison-resultant signal; a second OR circuit receiving the reset pulse signal and an output signal of the flip-flop circuit; an AND circuit receiving an output signal of the second OR circuit and a clock pulse signal; a counter which counts up pulses in an output signal of the AND circuit in response to an output signal of the first OR circuit; and a memory storing an output signal of the counter.

A sixth aspect of this invention provides a solid-state image taking apparatus comprising a photodiode converting incident light into a corresponding signal voltage; a reset switch connected to the photodiode for removing charges generated by the photodiode; a comparator for comparing the signal voltage with a predetermined reference voltage, and generating a comparison-resultant signal which assumes a high level when the signal voltage is lower than the reference voltage; a flip-flop circuit responding to the comparison-resultant signal, a start pulse signal, and a reset pulse signal; an AND circuit receiving an output signal of the flip-flop circuit and a clock pulse signal; a delay circuit for delaying the output signal of the flip-flop circuit; an OR circuit receiving the start pulse signal and an output signal of the delay circuit; a counter which counts up pulses in an output signal of the AND circuit in response to an output signal of the OR circuit; and a memory storing an output signal of the counter.

A seventh aspect of this invention provides a solid-state image taking apparatus comprising a photodiode converting incident light into a corresponding electric current; a resistor connected to the photodiode; a capacitor connected to the resistor and being charged by the electric current from the photodiode via the resistor; a reset switch connected to the capacitor for removing charges from the capacitor; a comparator for comparing a signal voltage at the capacitor with a predetermined reference voltage, and generating a comparison-resultant signal which assumes a high level when the signal voltage is lower than the reference voltage; a first AND circuit receiving the comparison-resultant signal and a clock pulse signal; means for generating a reset pulse signal; a second AND circuit receiving the reset pulse signal and an output signal of the first AND circuit; and a counter which counts up pulses in an output signal of the second AND circuit.

An eighth aspect of this invention provides a solid-state image taking apparatus comprising a photodiode converting incident light into a corresponding electric current; a resistor connected to the photodiode; a capacitor connected to the resistor and being charged by the electric current from the photodiode via the resistor; a reset switch connected to the capacitor for removing charges from the capacitor; a first comparator for comparing a signal voltage at the capacitor with a predetermined first reference voltage, and generating a first comparison-resultant signal which assumes a high level when the signal voltage is lower than the first reference voltage; a second comparator for comparing the signal voltage with a predetermined second reference voltage lower than the first reference voltage, and generating a second comparison-resultant signal which assumes a high level when the signal voltage is lower than the second reference voltage; a flip-flop circuit responding to the first and second comparison-resultant signals; a first OR circuit receiving a reset pulse signal and the first comparison-resultant signal; a second OR circuit receiving the reset pulse signal and an output signal of the flip-flop circuit; an AND circuit receiving an output signal of the second OR circuit and a clock pulse signal; a counter which counts up pulses in an output signal of the AND circuit in response to an output signal of the first OR circuit; and a memory storing an output signal of the counter.

A ninth aspect of this invention provides a solid-state image taking apparatus comprising a photodiode converting incident light into a corresponding electric current; a resistor connected to the photodiode; a capacitor connected to the resistor and being charged by the electric current from the photodiode via the resistor; a reset switch connected to the capacitor for removing charges from the capacitor; a comparator for comparing a signal voltage at the capacitor with a predetermined reference voltage, and generating a comparison-resultant signal which assumes a high level when the signal voltage is lower than the reference voltage; a flip-flop circuit responding to the comparison-resultant signal, a start pulse signal, and a reset pulse signal; an AND circuit receiving an output signal of the flip-flop circuit and a clock pulse signal; a delay circuit for delaying the output signal of the flip-flop circuit; an OR circuit receiving the start pulse signal and an output signal of the delay circuit; a counter which counts up pulses in an output signal of the AND circuit in response to an output signal of the OR circuit; and a memory storing an output signal of the counter.

A tenth aspect of this invention provides a solid-state image taking apparatus comprising a photodiode converting incident light into a first electric signal; means for converting the first electric signal generated by the photodiode into a second electric signal which varies with time at a variation rate depending on an intensity of the incident light; and means for measuring the variation rate to detect the intensity of the incident light.

DESCRIPTION OF THE PREFERRED EMBODIMENTS

First Embodiment

Figure 1:
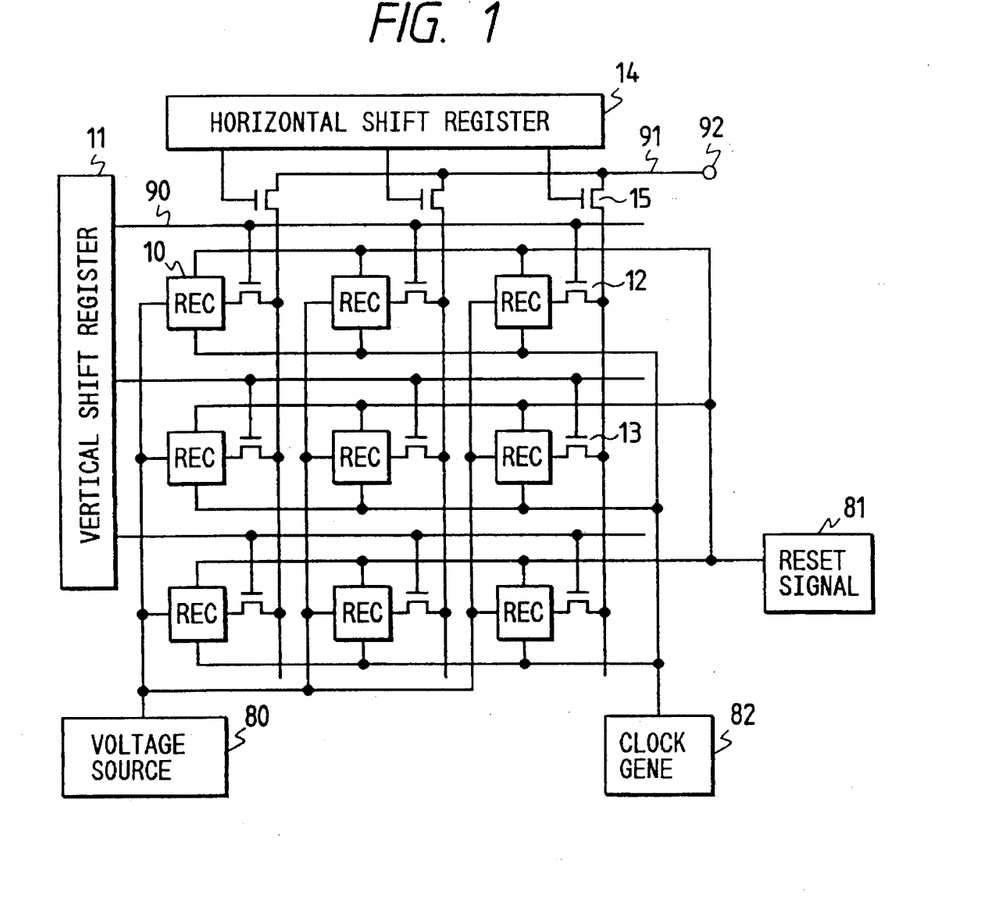
FIG. 1 is a diagram of a solid-state image taking apparatus according to a first embodiment of this invention.

With reference to FIG. 1, a solid-state image taking apparatus includes a two-dimensional array of light receiving circuits 10 corresponding to pixels respectively. The light receiving circuits 10 in one horizontal line are connected via vertical switches 12 to vertical signal lines 13 respectively. It should be noted that the vertical signal lines 13 are similar to n-bit data lines for reading out data from a RAM. Control terminals or gates of the vertical switches 12 in one horizontal line are connected in common to a horizontal control line 90 leading from a vertical shift register (a vertical digital scanner) 11. The vertical signal lines 13 are connected to an output signal line 91 via horizontal switches 15 respectively. Control terminals or gates of the horizontal switches 15 are connected to a horizontal shift register (a horizontal digital scanner) 14. The output signal line 91 leads to an output terminal 92.

Each of the light receiving circuits 10 has a photosensitive section. Each of the light receiving circuits 10 outputs a signal representing the intensity of light applied to the photosensitive section thereof.

The vertical switches 12, the horizontal switches 15, the vertical shift register 11, and the horizontal shift register 14 compose a scanning switch network which is basically similar to that in a typical RAM or a typical MOS image sensor. The vertical switches 12 and the horizontal switches 15 are controlled by the vertical shift register 11 and the horizontal shift register 14 so that the light receiving circuits 10 will be sequentially connected to the output signal line 91 in an order determined by a scanning format. Accordingly, the signals outputted from the respective light receiving circuits 10 are sequentially transmitted to the output signal line 91.

Figure 2:
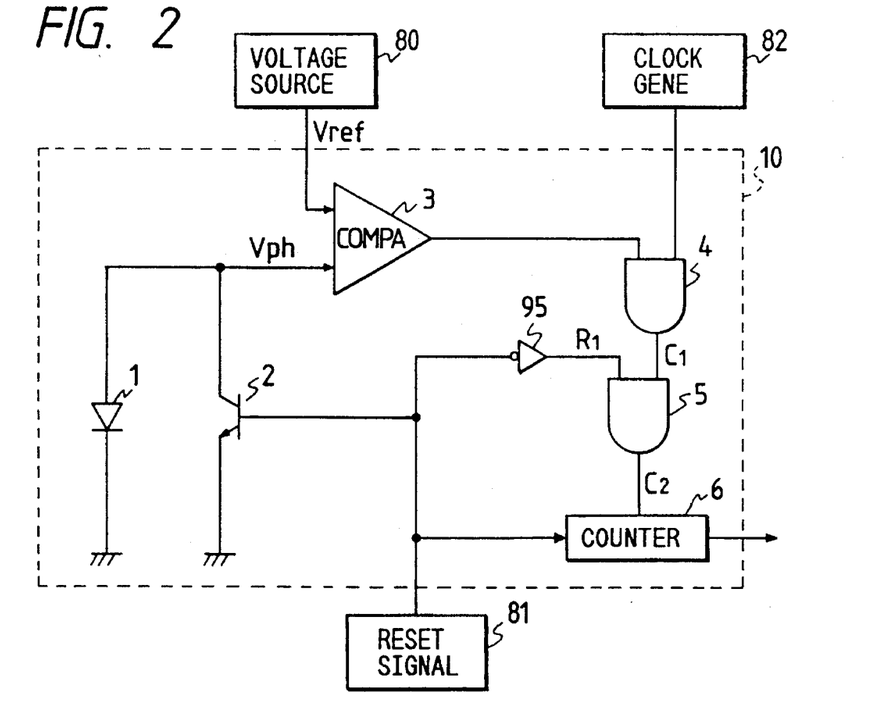
FIG. 2 is a diagram of a light receiving circuit in the apparatus of FIG. 1.

The light receiving circuits 10 have equal structures. One of the light receiving circuits 10 will be described in detail. As shown in FIG. 2, a light receiving circuit 10 includes a photodiode 1, a switch 2, a comparator 3, two-input AND gates 4 and 5, a counter 6, and an inverter 95. The switch 2 has an NPN transistor. The photodiode 1 is designed to basically serve as a voltage source. The cathode of the photodiode 1 is grounded. The anode of the photodiode 1 is connected to a first input terminal of the comparator 3 and the collector of the transistor 2. The emitter of the transistor 2 is grounded. A second input terminal of the comparator 3 receives a predetermined reference voltage Vref from a constant voltage source 80. The reference voltage Vref is higher than the minimum potential at the anode of the photodiode 1 (which is substantially equal to a zero voltage). The base of the transistor 2 receives a reset pulse signal from a pulse signal generator 81. The reset pulse signal has a predetermined constant frequency and a predetermined constant period. The reset pulse signal is applied to the input terminal of the inverter 95 and the reset terminal of the counter 6. The output terminal of the comparator 3 is connected to a first input terminal of the AND gate 4. A second input terminal of the AND gate 4 receives a clock pulse signal from a clock pulse generator 82. The clock pulse signal has a predetermined constant frequency and a predetermined constant period. It is preferable that pulses in the clock pulse signal are temporally spaced at equal intervals. The period of the clock pulse signal is sufficiently shorter than the period of the reset pulse signal. The output terminal of the AND gate 4 is connected to a first input terminal of the AND gate 5. The output terminal of the inverter 95 is connected to a second input terminal of the AND gate 5. The output terminal of the AND gate 5 is connected to the input terminal of the counter 6. The output terminal of the counter 6 is connected to the vertical switch 12 (see FIG. 1).

Figure 3:
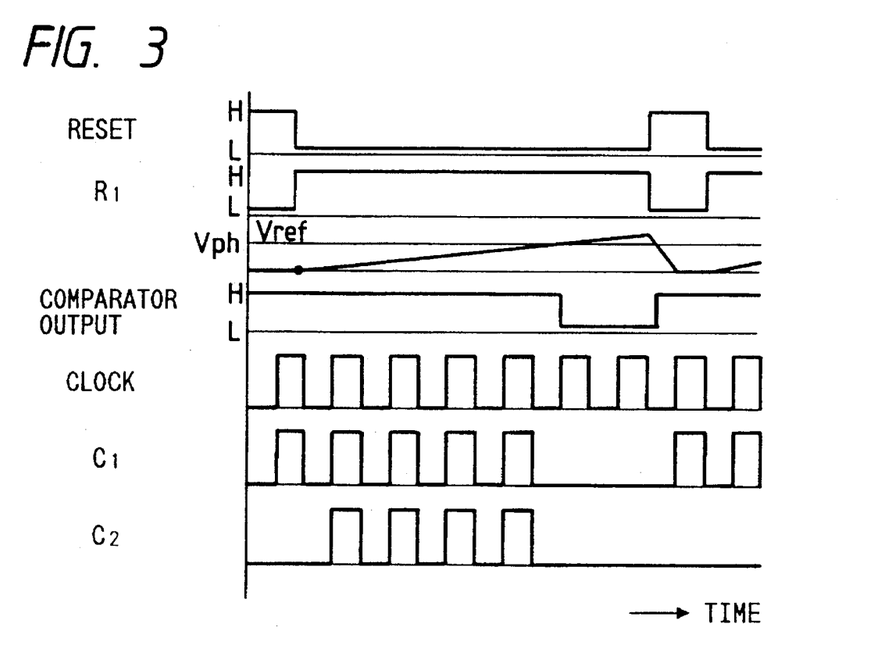
FIG. 3 is a time-domain diagram of various signals in the light receiving circuit of FIG. 2.

The light receiving circuit 10 operates as follows. A high-level pulse of the reset pulse signal makes conductive the collector-emitter path of the transistor 2 so that the anode of the photodiode 1 is short-circuited or shunted to the ground and charges generated by the photodiode 1 disappear. Thus, as shown in FIG. 3, the voltage Vph at the anode of the photodiode 1 is decreased to substantially zero in response to the high-level pulse of the reset pulse signal. In addition, as shown in FIG. 3, the output signal R1 of the inverter 95 assumes a low level in response to the high-level pulse of the reset pulse signal. The low-level output signal R1 of the inverter 95 closes the AND gate 5 so that, as shown in FIG. 3, the output signal C2 of the AND gate 5 assumes a low level. The device 3 compares the voltage Vph at the anode of the photodiode 1 with the reference voltage Vref, and generates a comparator output signal depending on whether or not the voltage Vph is lower than the reference voltage Vref. Specifically, the comparator output signal assumes a high level when the voltage Vph is lower than the reference voltage Vref. The comparator output signal assumes a low level when the voltage Vph is equal to or higher than the reference voltage Vref. In the presence of a high-level pulse of the reset pulse signal, the voltage Vph at the anode of the photodiode 1 is decreased to and held at substantially zero as previously described so that the voltage Vph is lower than the reference voltage Vref. Accordingly, the comparator 3 outputs a high-level signal (see FIG. 3) to the AND gate 4 and hence opens the AND gate 4. While the output signal of the comparator 3 remains at the high level, pulses in the clock pulse signal continue to pass through the AND gate 4 and then reach the AND gate 5 as shown by the waveform C1 in FIG. 3.

When the reset pulse signal changes from the high level to a low level, the collector-emitter path of the transistor 2 goes non-conductive so that the voltage Vph at the anode of the photodiode 1 starts to increase from substantially zero as shown in FIG. 3. The rate of the increase in the voltage Vph depends on the intensity of light applied to the photodiode 1. It is thought that a stray capacitor or a parasitic capacitor connected to the photodiode 1 causes a time-dependent increase in the voltage Vph. While the reset pulse signal remains at the low level, the voltage Vph at the anode of the photodiode 1 continues to increase at the rate depending on the intensity of the applied light.

The output signal R1 of the inverter 95 assumes a high level in response to the high-to-low change of the reset pulse signal. The high-level signal R1 from the inverter 95 opens the AND gate 5 so that pulses in the clock pulse signal start to pass through the AND gate 5 and then reach the counter 6 as shown by the waveform C2 in FIG. 3. While the output signal R1 of the inverter 95 remains at the high level, pulses in the clock pulse signal continue to pass through the AND gate 5. The device 6 counts up received pulses in the clock pulse signal.

When the voltage Vph at the anode of the photodiode 1 reaches the reference voltage Vref, the output signal of the comparator 3 changes from the high level to a low level as shown in FIG. 3. The low-level signal from the comparator 3 closes the AND gate 4, inhibiting or interrupting the transmission of pulses in the clock pulse signal to the counter 6.

Accordingly, the number of pulses counted by the counter 6 depends on the interval of time during which the voltage Vph at the anode of the photodiode 1 increases from substantially zero to the reference voltage Vref. The counter 6 outputs a digital signal representing the number of counted pulses. Since the interval of time during which the voltage Vph increases from substantially zero 10 to the reference voltage Vref depends on the rate of the increase in the voltage Vph, the output signal of the counter 6 represents the rate of the increase in the voltage Vph, that is, the intensity of the applied light. It is preferable that the output signal of the counter 6 is transmitted to the output signal line 91 via the vertical switch 12 and the horizontal switch 15 at a timing immediately before the counter 6 is reset.

As previously described, the output signals of the light receiving circuits 10 or the output signals of the counters 6 in the light receiving circuits 10 are sequentially transmitted to the output signal line 91 via the scanning switch network including the vertical switches 12 and the horizontal switches 15.

According to a first example, the reset pulse signals applied to the respective light receiving circuits 10 have different phases. In this case, high-level reset signal pulses may be sequentially distributed from a common signal source to the light receiving circuits 10 via a switch network similar to the previously-indicated scanning switch network.

In a second example, the reset pulse signals applied to the respective light receiving circuits 10 are the same.

Generally, the reference voltages Vref in the respective light receiving circuits 10 are the same. The reference voltages Vref in the respective light receiving circuits 10 may be different from each other.

It should be noted that the counter 6 in each receiving circuit 10 may be replaced by an analog integration circuit.

It should be noted that, in each of the light receiving circuits 10, the photodiode 1 may be reversely connected to the transistor 2 and the comparator 3. In this case, the anode of the photodiode 1 is grounded, and the cathode of the photodiode 1 is connected to the collector of the transistor 2 and the comparator 3.

Second Embodiment

A second embodiment of this invention is similar to the embodiment of FIGS. 1–3 except that the interval between adjacent pulses in a clock pulse signal applied to each light receiving circuit 10 (see FIGS. 1 and 2) is proportional to the time T elapsed since a moment of the change of a reset pulse signal from a high level to a low level.

The second embodiment includes a clock pulse signal converter which changes a fixed-period clock pulse signal into a variable-period clock pulse signal applied to each light receiving circuit 10 (see FIGS. 1 and 2).

Figure 13:
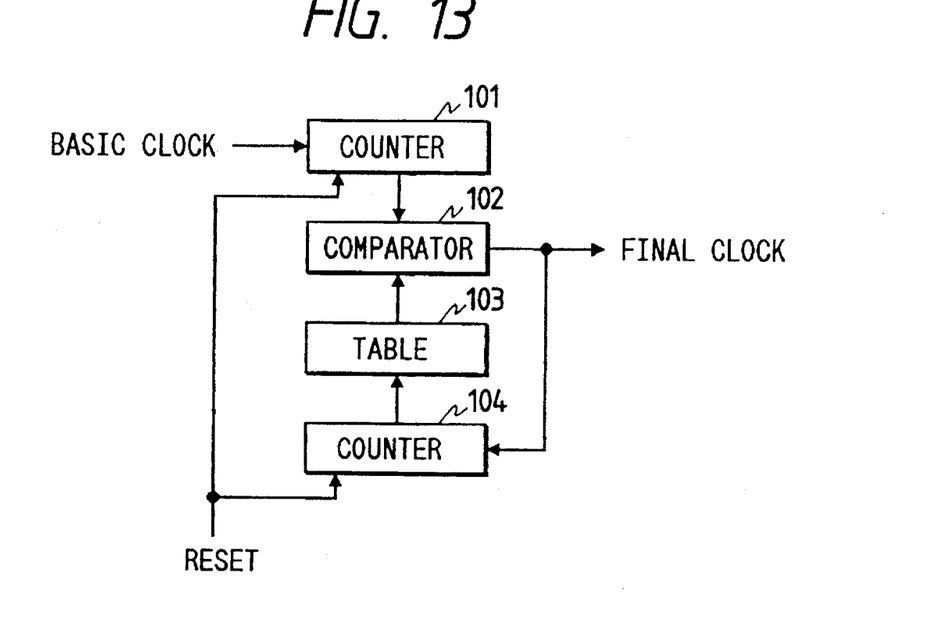
FIG. 13 is a block diagram of a clock pulse signal converter in a second embodiment of this invention.

As shown in FIG. 13, the clock pulse signal converter includes counters 101 and 104, a comparator 102, and a table 103. The counter 101 receives the fixed-period clock pulse signal (a basic clock pulse signal) from a clock pulse signal generator (not shown). The device 101 counts up pulses in the basic clock pulse signal, and outputs an n-bit signal to the comparator 102 which indicates the number of counted pulses where "n" denotes a given natural number. The counter 101 is reset to a state of "0" in response to the reset pulse signal.

The comparator 102 receives an n-bit output signal from the table 103. The device 102 compares the output signal from the counter 10 1 and the output signal from the table 103. When the output signal from the counter 101 and the output signal from the table 103 are equal to each other, the comparator 102 outputs a high-level signal. Otherwise, the comparator 102 outputs a low-level signal. The output signal from the comparator 102 is the variable-period clock pulse signal (a final clock pulse signal) fed to each light receiving circuit 10 (see FIGS. 1 and 2).

The counter 104 receives the output signal from the comparator 102. The device 104 counts up pulses in the output signal from the comparator 102, and outputs an m-bit signal to the table 103 which indicates the number of counted pulses where "m"denotes a given natural number. The counter 104 is reset to a state of "0" in response to the reset pulse signal.

The table 103 includes a ROM or a RAM in which different states of the n-bit signal are previously stored in respective storage locations designated by different addresses each having "m" bits. In other words, the table 103 stores information of a predetermined relation between the m-bit signal and the n-bit signal. The table 103 responds to the n-bit output signal from the counter 104 as an address signal, and converts the n-bit output signal from the counter 104 into a corresponding m-bit signal fed to the comparator 102.

The clock pulse signal converter of FIG. 13 operates as follows. First, the counters 101 and 104 are reset to the states of "0" in response to the reset pulse signal. Then, the number represented by the output signal from the counter 101 is incremented by every pulse of the basic clock pulse signal. The output signal from the comparator 102 (the final clock pulse signal) remains at the low-level state until the number represented by the output signal from the counter 101 reaches the number represented by the output signal from the table 103. The output signal from the comparator 102 (the final clock pulse signal) changes from the low level to the high level when the number represented by the output signal from the counter 10 1 reaches the number represented by the output signal from the table 103. The output signal from the counter 104 is updated in response to the low-to-high change of the output signal from the comparator 102. Therefore, the output signal from the table 103 is also updated so that the number represented by the output signal from the table changes to a new number. The output signal from the comparator 102 returns to the low level in response to the change in the output signal from the table 103.

During a subsequent period, the output signal from the comparator 102 (the final clock pulse signal) remains at the low-level state until the number represented by the output signal from the counter 101 reaches the new number represented by the output signal from the table 103. The output signal from the comparator 102 (the final clock pulse signal) changes from the low level to the high level when the number represented by the output signal from the counter 101 reaches the new number represented by the output signal from the table 103. The output signal from the counter 104 is updated in response to the low-to-high change of the output signal from the comparator 102. Therefore, the output signal from the table 103 is also updated so that the number represented by the output signal from the table changes to a new number. The output signal from the comparator 102 returns to the low level in response to the change in the output signal from the table 103.

The above-indicated processes are reiterated so that the period of the final clock pulse signal (the output signal from the comparator 102) varies as the time elapses from the moment of the occurrence of the resetting action according to a function determined by the table 103. The table 103 is designed so that the interval between adjacent pulses in the final clock pulse signal applied to each light receiving circuit 10 (see FIGS. 1 and 2) is proportional to the time T elapsed since a moment of the change of the reset pulse signal from a high level to a low level.

Third Embodiment

A third embodiment of this invention is similar to the embodiment of FIGS. 1–3 except that the interval between adjacent pulses in a clock pulse signal applied to each light receiving circuit 10 is proportional to the square of the time T elapsed. since a moment of the change of a reset pulse signal from a high level to a low level.

The third embodiment includes a clock pulse signal converter similar to the clock pulse signal converter of FIG. 13. In the clock pulse signal converter of the third embodiment, a table 103 (see FIG. 13) is designed so that the interval between adjacent pulses in a final clock pulse signal applied to each light receiving circuit 10 is proportional to the square of the time T elapsed since the moment of the change of the reset pulse signal from the high level to the low level.

Fourth Embodiment

A fourth embodiment of this invention is similar to the embodiment of FIGS. 1–3 except that the interval between adjacent pulses in a clock pulse signal applied to each light receiving circuit 10 has a function of time as "log(T)", where T denotes the time elapsed since a moment of the change of a reset pulse signal from a high level to a low level.

The fourth embodiment includes a clock pulse signal converter similar to the clock pulse signal converter of FIG. 13. In the clock pulse signal converter of the fourth embodiment, a table 103 (see FIG. 13) is designed so that the interval between adjacent pulses in a final clock pulse signal applied to each light receiving circuit 10 has a function of time as "log(T)", where T denotes the time elapsed since the moment of the change of the reset pulse signal from the high level to the low level.

Fifth Embodiment

A fifth embodiment of this invention is similar to the embodiment of FIGS. 1–3 except that the interval between adjacent pulses in a clock pulse signal applied to each light receiving circuit 10 has a function of time as "$T\gamma^{+1}$", where T denotes the time elapsed since a moment of the change of a reset pulse signal from a high level to a low level and "$\gamma$" denotes a predetermined factor related to gamma correction.

The fifth embodiment includes a clock pulse signal converter similar to the clock pulse signal converter of FIG. 13. In the clock pulse signal converter of the fifth embodiment, a table 103 (see FIG. 13) is designed so that the interval between adjacent pulses in a final clock pulse signal applied to each light receiving circuit 10 has a function of time as "$T\gamma^{+1}$", where T denotes the time elapsed since the moment of the change of the reset pulse signal from the high level to the low level and "$\gamma$" denotes the predetermined factor related to gamma correction.

Sixth Embodiment

A sixth embodiment of this invention is similar to the embodiment of FIGS. 1–3 except that the reference voltage Vref in each light receiving circuit 10 decreases with a lapse of time during the interval between adjacent high-level pulses in a reset pulse signal. Specifically, the reference voltage Vref has a function of time as follows.

$$Vref(T)=V0(T0-T)/T0$$

where T denotes the time elapsed since a moment of the change of the reset pulse signal from a high level to a low level, and T0 denotes a maximum light measurement time and V0 denotes a predetermined constant.

Figure 14:
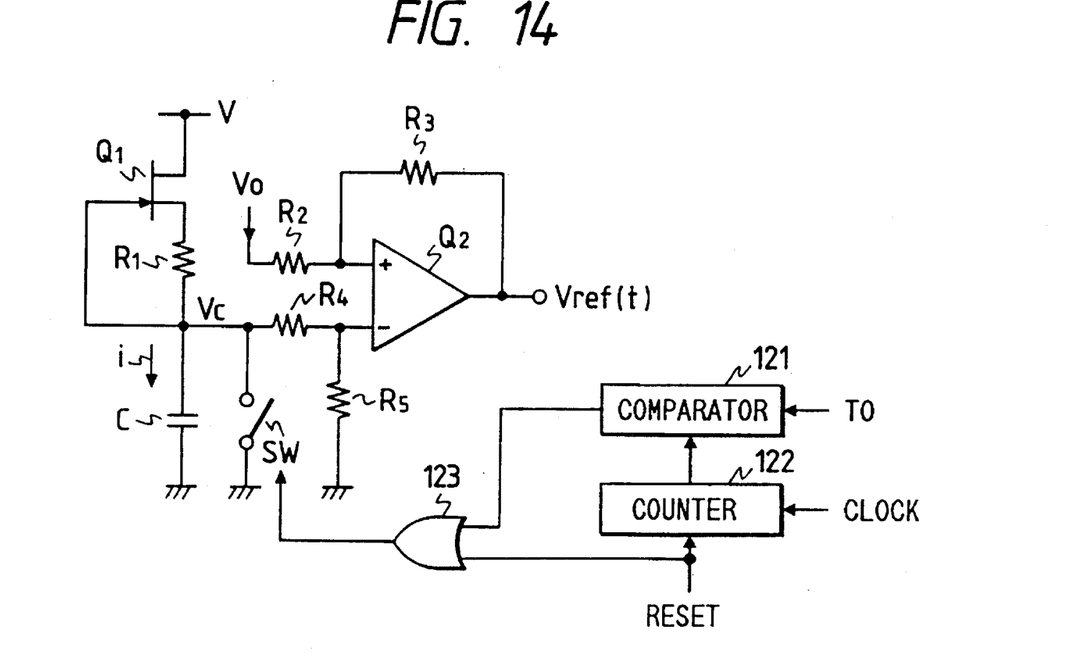
FIG. 14 is a diagram of a triangular wave generator in a sixth embodiment of this invention.

The sixth embodiment includes a triangular wave generator or a saw-tooth wave generator. As shown in FIG. 14, the triangular wave generator includes a combination of a transistor Q1, an operational amplifier Q2, resistors R1, R2, R3, R4, and R5, a capacitor C, a switch SW, a comparator 121, a counter 122, and a two-input OR gate 123.

The transistor Q1 and the resistor R1 compose a constant-current circuit which charges the capacitor C by a constant current. The magnitude of the charging current is determined by the resistance of the resistor R1. The switch SW is connected across the capacitor C for selectively discharging the capacitor C in response to a reset signal or an output signal from the comparator 121 which is fed via the OR gate 123.

The inverting input terminal of the operational amplifier Q2 is connected to the capacitor C via the resistor R4. The inverting input terminal of the operational amplifier Q2 is grounded via the resistor R5. The non-inverting input terminal of the operational amplifier Q2 is connected via the resistor R2 to the positive terminal of a constant voltage source generating a given voltage V0. The non-inverting input terminal of the operational amplifier Q2 is connected to the output terminal thereof via the resistor R3. The reference voltage Vref appears at the output terminal of the operational amplifier Q2. The resistances of the resistors R2-R5 are equal to each other.

The counter 122 is reset to a state of "0" in response to the reset signal. The counter 122 counts up pulses in a clock pulse signal, and outputs a signal to the comparator 121 which represents the number of counted pulses. The comparator 121 compares the output signal from the counter 122 with a predetermined reference signal corresponding to the time T0. When the output signal from the counter 122 agrees with the reference signal, the comparator 121 outputs an active signal which closes the switch SW. Otherwise, the comparator 121 outputs an inactive signal which opens the switch SW.

Tile triangular wave generator of FIG. 14 operates as follows. The voltage Vc across the capacitor C increases as the time T elapses from the moment of the occurrence of the resetting action according to the following equation.

$$Vc(T)=\frac{V0}{T0} \cdot T$$

The charging current to the capacitor C is chosen so that the voltage Vc across the capacitor C will increase to the level V0 when the elapsed time T reaches the time T0. The voltage Vc across the capacitor C is applied to the operational amplifier Q2. The voltage V0 is also fed to the operational amplifier Q2. The operational amplifier Q2 and the resistors R2-R5 compose a difference circuit or a subtractor which outputs the reference voltage Vref expressed as follows.

$$Vref(T)=V0-Vc(T)=V0(T0-T)/T0$$

Seventh Embodiment

Figure 4:
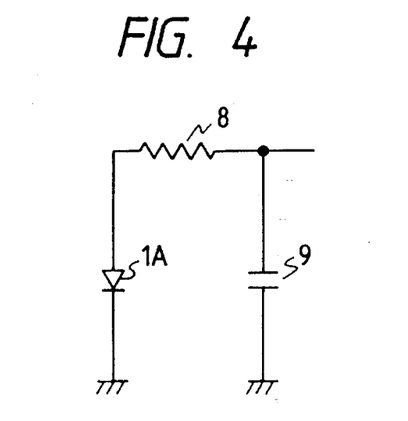
FIG. 4 is a schematic diagram of a portion of a solid-state image taking apparatus according to a seventh embodiment of this invention.

FIG. 4 shows a portion of a seventh embodiment of this invention which is similar to the embodiment of FIGS. 1–3 except for design changes indicated hereinafter.

In the embodiment of FIG. 4, a combination of a photodiode 1A, a fixed resistor 8, and a capacitor 9 replaces the photodiode 1 of FIG. 2. The cathode of the photodiode 1A is grounded. The anode of the photodiode 1A is connected to a first end of the resistor 8. A first end of the capacitor 9 is grounded. A second end of the resistor 8 and a second end of the capacitor 9 are connected to a switch 2 and a compau-ator 3 (see FIG. 2). The photodiode 1A is designed to basically serve as a current source.

It should be noted that the photodiode 1A may be reversely connected to the resistor 8. In this case, the anode of the photodiode 1A is grounded, and the cathode of the photodiode 1A is connected to the resistor 8.

Eighth Embodiment

Figure 5:
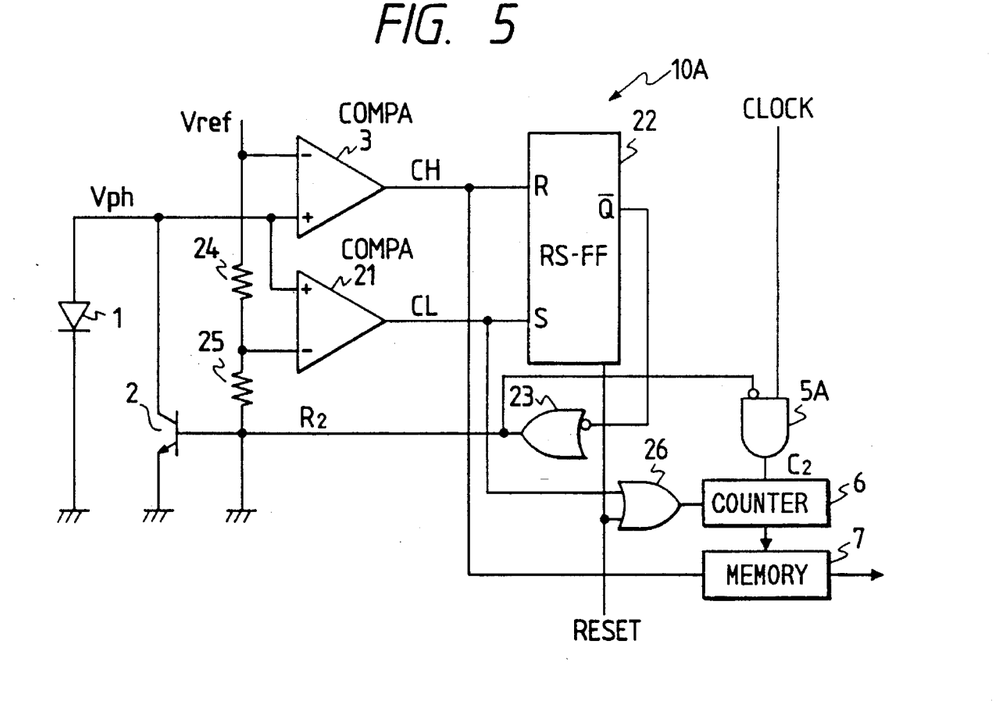
FIG. 5 is a diagram of a light receiving circuit in a solid-state image taking apparatus according to an eighth embodiment of this invention.

FIG. 5 shows a portion of an eighth embodiment of this invention which is similar to the embodiment of FIGS. 1–3 except for design changes indicated hereinafter.

In the embodiment of FIG. 5, a light receiving circuit 10A replaces the light receiving circuit 10 of FIGS. 1 and 2. The light receiving circuit 10A includes a photodiode 1, a switch 2, a comparator 3, a two-input AND gate 5A, a counter 6, a memory or latch 7, a comparator 21, an RS flip-flop 22, two-input OR gates 23 and 26, and fixed resistors 24 and 25. The switch 2 has an NPN transistor. The photodiode 1 is designed to basically serve as a voltage source.

The cathode of the photodiode 1 is grounded. The anode of the photodiode 1 is connected to a first input terminal of the comparator 3 and the collector of the transistor 2. The anode of the photodiode 1 is also connected to a first input terminal of the comparator 21. The emitter of the transistor 2 is grounded. A second input terminal of the comparator 3 receives a predetermined reference voltage Vref from a constant voltage source (not shown). The reference voltage Vref is higher than the minimum potential at the anode of the photodiode 1 (which is substantially equal to a zero voltage). A first end of the resistor 24 is subjected to the reference voltage Vref. A second end of the resistor 24 is connected to a second input terminal of the comparator 21 and a first end of the resistor 25. A second end of the resistor 25 is grounded. The resistors 24 and 25 compose a voltage divider which derives a predetermined lower limit voltage Vlow from the reference voltage Vref. The lower limit voltage Vlow is higher than a zero voltage but lower than the reference voltage Vref. The lower limit voltage Vlow is applied to the second input terminal of the comparator 21.

The output terminal of the comparator 3 is connected to the "R" terminal (the reset terminal) of the flip-flop 22 and the control terminal of the memory 7. The output terminal of the comparator 21 is connected to the "S" terminal (the set terminal) of the flip-flop 22 and a first input terminal of the OR gate 26. The $\overline{Q}$ output terminal of the flip-flop 22 is connected to a first input terminal of the OR gate 23 via an inverter incorporated in the OR gate 23. The control terminal of the flip-flop 22 receives a reset pulse signal from a pulse signal generator (not shown). The reset pulse signal has a predetermined constant frequency and a predetermined constant period. A second input terminal of the OR gate 23 and a second input terminal of the OR gate 26 are subjected to the reset pulse signal. The output terminal of the OR gate 23 is connected to the base of the transistor 2. The output terminal of the OR gate 23 is also connected to a first input terminal of the AND gate 5A via an inverter incorporated in the AND gate 5A.

A second input terminal of the AND gate 5A receives a clock pulse signal from a clock pulse generator (not shown). The clock pulse signal has a predetermined constant frequency and a predetermined constant period. It is preferable that pulses in the clock pulse signal are temporally spaced at equal intervals. The period of the clock pulse signal is sufficiently shorter than the period of the reset pulse signal. The output terminal of the AND gate 5A is connected to the input terminal of the counter 6. The output terminal of the OR gate 26 is connected to the reset terminal of the counter 6. The output terminal of the counter 6 is connected to the input terminal of the memory 7. The output terminal of the memory 7 is connected to a vertical switch 12 (see FIG. 1).

Figure 6:
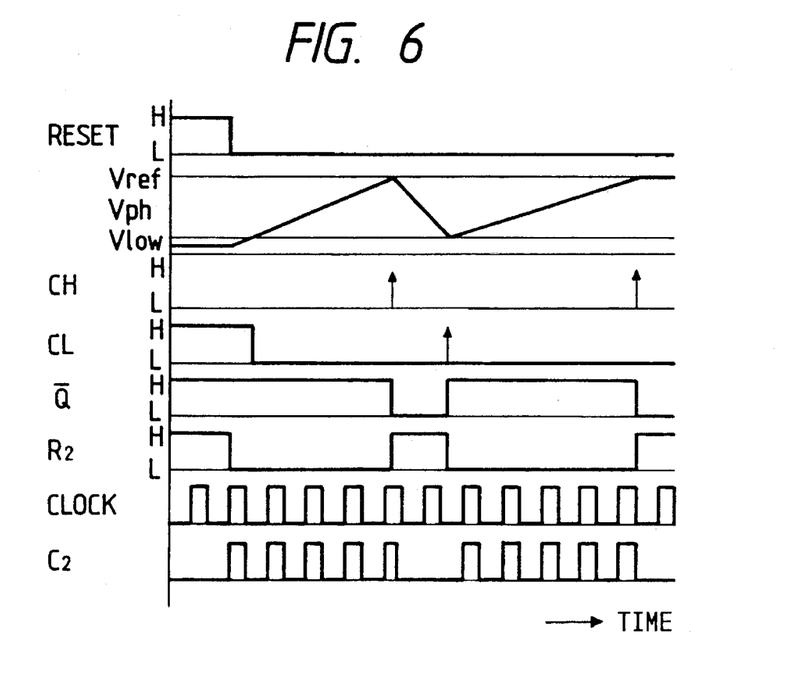
FIG. 6 is a time-domain diagram of various signals in the light receiving circuit of FIG. 5.

The light receiving circuit 10A operates as follows. A high-level pulse of the reset pulse signal sets a $\overline{Q}$ output signal of the flip-flop 22 to a high level as shown in FIG. 6. In addition, the high-level pulse of the reset pulse signal sets the output signal of the OR gate 26 to a high level so that the counter 6 is reset. As shown in FIG. 6, the OR gate 23 outputs a high-level signal R2 in response to the high-level pulse of the reset pulse signal. The high-level signal R2 from the OR gate 23 makes conductive the collector-emitter path of the transistor 2 so that the anode of the photodiode 1 is short-circuited or shunted to the ground and charges generated by the photodiode 1 disappear. Thus, as shown in FIG. 6, the voltage Vph at the anode of the photodiode 1 is decreased to substantially zero in response to the high-level signal R2 from the OR gate 23. In addition, the high-level signal R2 from the OR gate 23 closes the AND gate 5A so that, as shown in FIG. 6, the output signal C2 of the AND gate 5A assumes a low level.

The device 3 compares the voltage Vph at the anode of the photodiode 1 with the reference voltage Vref, and outputs a signal CH depending on whether or not the voltage Vph is lower than the reference voltage Vref. Specifically, the output signal CH of the comparator 3 assumes a low level when the voltage Vph is lower than the reference voltage Vref. The comparator output signal CH assumes a high level when the voltage Vph is equal to or higher than the reference voltage Vref. The device 21 compares the voltage Vph at the anode of the photodiode 1 with the lower limit voltage Vlow, and outputs a signal CL depending on whether or not the voltage Vph is higher than the lower limit voltage Vlow. Specifically, the output signal CL of the comparator 21 assumes a high level when the voltage Vph is equal to or lower than the lower limit voltage Vlow. The comparator output signal CL assumes a low level when the voltage Vph is higher than the lower limit voltage Vlow.

In the presence of a high-level pulse of the reset pulse signal, the voltage Vph at the anode of the photodiode 1 is decreased to and held at substantially zero as previously described so that the voltage Vph is lower than both the lower limit voltage Vlow and the reference voltage Vref. Accordingly, the comparator 3 outputs a low-level signal CH while the comparator 21 outputs a high-level signal CL as shown in FIG. 6.

When the reset pulse signal changes from the high level to a low level, the output signal R2 of the OR gate 23 changes to a low level and therefore the collector-emitter path of the transistor 2 goes non-conductive so that the voltage Vph at the anode of the photodiode 1 starts to increase from substantially zero as shown in FIG. 6. It is thought that a stray capacitor or a parasitic capacitor connected to the photodiode 1 causes a time-dependent increase in the voltage Vph. While the output signal R2 of the OR gate 23 remains at the low level, the voltage Vph at the anode of the photodiode 1 continues to increase. When the voltage Vph exceeds the lower limit voltage Vlow, the output signal CL of the comparator 21 changes from the high level to the low level as shown in FIG. 6.

The low-level signal R2 from the OR gate 23 opens the AND gate 5A so that pulses in the clock pulse signal start to pass through the AND gate 5A and then reach the counter 6 as shown by the waveform C2 in FIG. 6. While the output signal R2 of the OR gate 23 remains at the low level, pulses in the clock pulse signal continue to pass through the AND gate 5A. The device 6 counts up received pulses in the clock pulse signal.

When the voltage Vph at the anode of the photodiode 1 reaches the reference voltage Vref, the output signal CH of the comparator 3 changes from the low level to the high level as shown in FIG. 6. The memory 7 samples and holds the output signal of the counter 6 in response to the low-to-high change of the output signal CH of the comparator 3. At the same time, as shown in FIG. 6, the $\overline{Q}$ output signal of the flip-flop 22 changes from the high level to a low level in response to the low-to-high change of the output signal CH of the comparator 3. Therefore, the output signal R2 of the OR gate 23 changes from the low level to the high level. The high-level signal R2 from the OR gate 23 closes the AND gate 5A, inhibiting the transmission of pulses in the clock pulse signal to the counter 6. While the output signal R2 of the OR gate 23 remains at the high level, the transmission of pulses to the counter 6 continues to be inhibited as shown by the waveform C2 in FIG. 6. In addition, the high-level signal R2 from the OR gate 23 makes conductive the collector-emitter path of the transistor 2 so that the anode of the photodiode 1 is short-circuited or shunted to the ground. Accordingly, the voltage Vph at the anode of the photodiode 1 decreases.

When the voltage Vph at the anode of the photodiode 1 drops to the lower limit voltage Vlow, the output signal CL of the comparator 21 changes from the low level to the high level. The low-to-high change of the output signal CL of the comparator 21 travels to the counter 6 via the OR gate 26 so that the counter 6 is reset. At the same time. as shown in FIG. 6, the $\overline{Q}$ output signal of the flip-flop 22 changes from the low level to the high level in response to the low-to-high change of the output signal CL of the comparator 21. Thus. the output signal R2 of the OR gate 23 changes from the high level to the low level, opening the AND gate 5A and permitting the transmission of pulses in the clock pulse signal to the counter 6 as shown by the waveform C2 in FIG. 6.

The low-level signal R2 from the OR gate 23 makes non-conductive the collector-emitter path of the transistor 2 so that the voltage Vph at the anode of the photodiode 1 starts to increase from the lower limit voltage Vlow as shown in FIG. 6. The rate of the increase in the voltage Vph depends on the intensity of light applied to the photodiode 1. It is thought that a stray capacitor or a parasitic capacitor connected to the photodiode 1 causes a time-dependent increase in the voltage Vph. While the output signal R2 of the OR gate 23 remains at the low level, the voltage Vph at the anode of the photodiode 1 continues to increase at the rate depending on the intensity of the applied light.

The low-level signal R2 from the OR gate 23 opens the AND gate 5A so that pulses in the clock pulse signal start to pass through the AND gate 5A and then reach the counter 6 as shown by the waveform C2 in FIG. 6. While the output signal R2 of the OR gate 23 remains at the low level. pulses in the clock pulse signal continue to pass through the AND gate 5A. The device 6 counts up received pulses in the clock pulse signal.

When the voltage Vph at the anode of the photodiode 1 reaches the reference voltage Vref, the output signal CH of the comparator 3 changes from the low level to the high level as shown in FIG. 6. The memory 7 samples and holds the output signal of the counter 6 in response to the low-to-high change of the output signal CH of the comparator 3. At the same time, as shown in FIG. 6, the $\overline{Q}$ output signal of the flip-flop 22 changes from the high level to the low level in response to the low-to-high change of the output signal CH of the comparator 3. Therefore, the output signal R2 of the OR gate 23 changes from the low level to the high level. The high-level signal R2 from the OR gate 23 closes the AND gate 5A, inhibiting the transmission of pulses in the clock pulse signal to the counter 6. In addition, the high-level signal R2 from the OR gate 23 makes conductive the collector-emitter path of the transistor 2 so that the anode of the photodiode 1 is short-circuited or shunted to the ground. Accordingly, the voltage Vph at the anode of the photodiode 1 decreases.

As understood from the previous description, the number of pulses counted by the counter 6 depends on the interval of time during which the voltage Vph at the anode of the photodiode 1 increases from the lower limit voltage Vlow to the reference voltage Vref. The counter 6 outputs a digital signal representing the number of counted pulses. Since the interval of time during which the voltage Vph increases from the lower limit voltage Vlow to the reference voltage Vref depends on the rate of the increase in the voltage Vph, the output signal of the counter 6 represents the rate of the increase in the voltage Vph, that is, the intensity of the applied light. The output signal of the counter 6 which represents the intensity of the applied light is stored into the memory 7 at a timing immediately before the counter 6 is reset. Then, the signal is transmitted from the memory 7 to an output signal line 91 (see FIG. 1) via the vertical switch 12 and a horizontal switch 15 (see FIG. 1) at a suitable timing.

Figure 7:
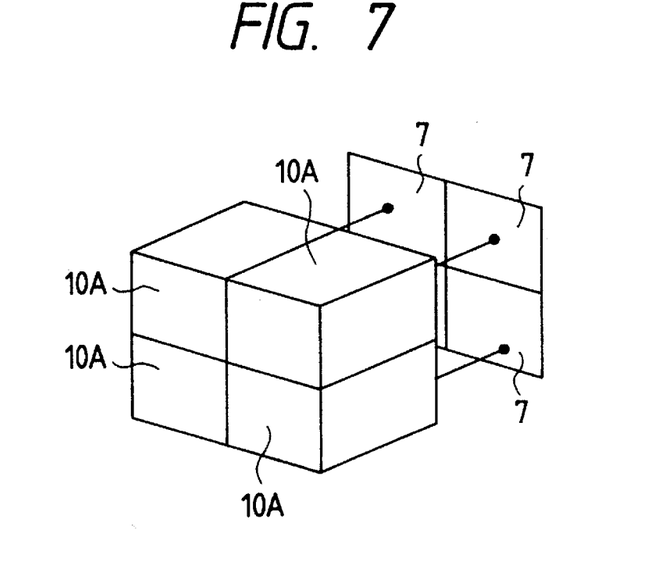
FIG. 7 is a perspective diagram of a portion of the apparatus according to the eighth embodiment.
Figure 8:
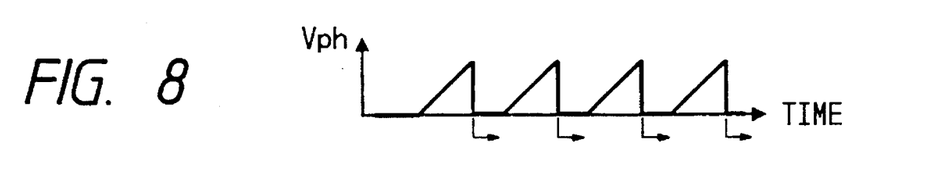
FIG. 8 is a time-domain diagram of a voltage at the anode of a photodiode in a light receiving circuit which is exposed to light having an intermediate Intensity in the apparatus of FIG. 7.
Figure 9:
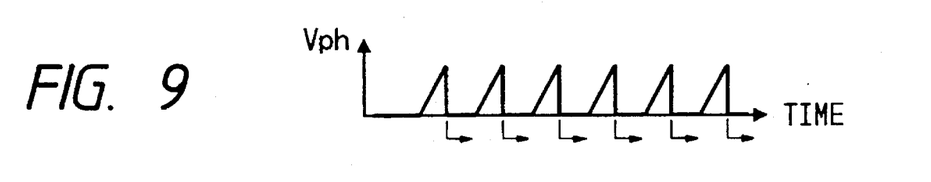
FIG. 9 is a time-domain diagram of a voltage at the anode of a photodiode in a light receiving circuit which is exposed to light having a great Intensity In the apparatus of FIG. 7.
Figure 10:
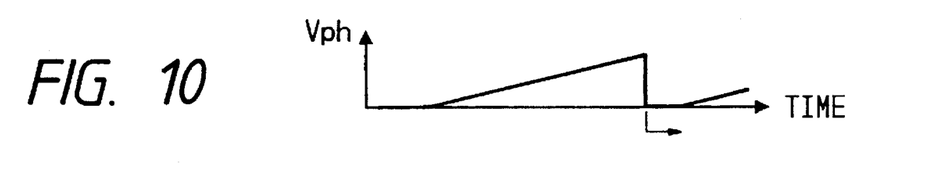
FIG. 10 is a time-domain diagram of a voltage at the anode of a photodiode in a light receiving circuit which is exposed to light having a small intensity in the apparatus of FIG. 7.

As shown in FIG. 7, the light receiving circuits 10A compose a matrix array. The light receiving circuits 10A have the respective memories 7 which compose a two-dimensional array. The memories 7 are accessed at independent timings to write the signals thereinto respectively. With reference to FIGS. 8, 9, and 10, in each of the light receiving circuits 10A, the counter output signal is sampled by and written into the memory 7 to update the signal in the memory 7 every time the voltage Vph have just reached the reference voltage Vref. Then, the signal is read out and transferred from the memory 7. Accordingly, the signal writing into the memory 7 and the signal readout from the memory 7 are executed periodically. The timing of the updating of the signal in the memory 7 (the signal writing into the memory 7) varies from light receiving circuit to light receiving circuit. FIG. 8 shows conditions of sampling of the counter output signal which occur in the light receiving circuit 10A where the photodiode 1 is exposed to light having an intermediate intensity. FIG. 9 shows conditions of sapling of the counter output signal which occur in the light receiving circuit 10A where the photodiode 1 is exposed to light having a great intensity. FIG. 10 shows conditions of sapling of the counter output signal which occur in the light receiving circuit 10A where the photodiode 1 is exposed to light having a small intensity. As understood from FIGS. 8, 9, and 10, the period of sapling of the counter output signal decreases as the intensity of the applied light increases.

A prior-art memory-cell accessing technique for a DRAM may be used in sequentially reading out the signals from the memories 7 in an order determined by a scanning format.

It should be noted that the photodiode 1 in each light receiving circuit 10A may be replaced by a combination of a photodiode 1A, a resistor 8, and a capacitor 9 as in the embodiment of FIG. 4.

It should be noted that, in each of the light receiving circuits 10A, the photodiode 1 may be reversely connected to the transistor 2 and the comparators 3 and 21. In this case, the anode of the photodiode 1 is grounded, and the cathode of the photodiode 1 is connected to the collector of the transistor 2 and the comparators 3 and 21.

Ninth Embodiment

Figure 11:
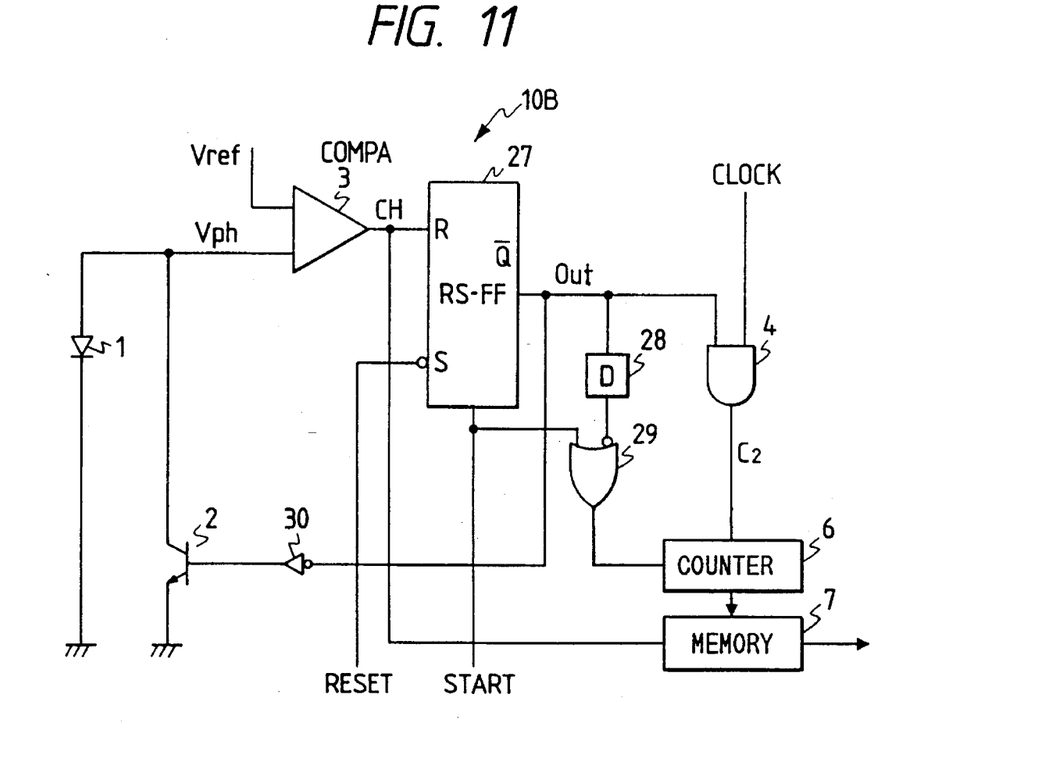
FIG. 11 is a diagram of a light receiving circuit in a solid-state image taking apparatus according to a ninth embodiment of this invention.

FIG. 11 shows a portion of a ninth embodiment of this invention which is similar to the embodiment of FIGS. 1–3 except for design changes indicated hereinafter.

In the embodiment of FIG. 11, a light receiving circuit 10B replaces the light receiving circuit 10 of FIGS. 1 and 2. The light receiving circuit 10B includes a photodiode 1, a switch 2, a comparator 3, a two-input AND gate 4, a counter 6, a memory or latch 7, an RS flip-flop 27, a delay circuit 28, a two-input OR gate 29, and an inverter 30. The switch 2 has an NPN transistor. The photodiode 1 is designed to basically serve as a voltage source.

The cathode of the photodiode 1 is grounded. The anode of the photodiode 1 is connected to a first input terminal of the comparator 3 and the collector of the transistor 2. The emitter of the transistor 2 is grounded. A second input terminal of the comparator 3 receives a predetermined reference voltage Vref from a constant voltage source (not shown). The reference voltage Vref is higher than the minimum potential at the anode of the photodiode 1 (which is substantially equal to a zero voltage).

The output terminal of the comparator 3 is connected to the "R" terminal (the reset terminal) of the flip-flop 27 and the control terminal of the memory 7. The $\overline{Q}$ output terminal of the flip-flop 27 is connected to a first input terminal of the AND gate 4, the input terminal of the delay circuit 28, and the input terminal of the inverter 30. The "S" terminal (the set terminal) of the flip-flop 27 receives a reset pulse signal from a pulse signal generator (not shown). The reset pulse signal has a predetermined constant frequency and a predetermined constant period. The control terminal of the flip-flop 27 receives a start pulse signal from a pulse signal generator (not shown). The output terminal of the inverter 30 is connected to the base of the transistor 2. A first input terminal of the OR gate 29 is subjected to the start pulse signal. The output terminal of the delay circuit 28 is connected to a second input terminal of the OR gate 29 via an inverter incorporated in the OR gate 29.

A second input terminal of the AND gate 4 receives a clock pulse signal from a clock pulse generator (not shown). The clock pulse signal has a predetermined constant frequency and a predetermined constant period. It is preferable that pulses in the clock pulse signal are temporally spaced at equal intervals. The period of the clock pulse signal is sufficiently shorter than the period of the reset pulse signal. The output terminal of the AND gate 4 is connected to the input terminal of the counter 6. The output terminal of the OR gate 29 is connected to the reset terminal of the counter 6. The output terminal of the counter 6 is connected to the input terminal of the memory 7. The output terminal of the memory 7 is connected to a vertical switch 12 (see FIG. 1).

Figure 12:
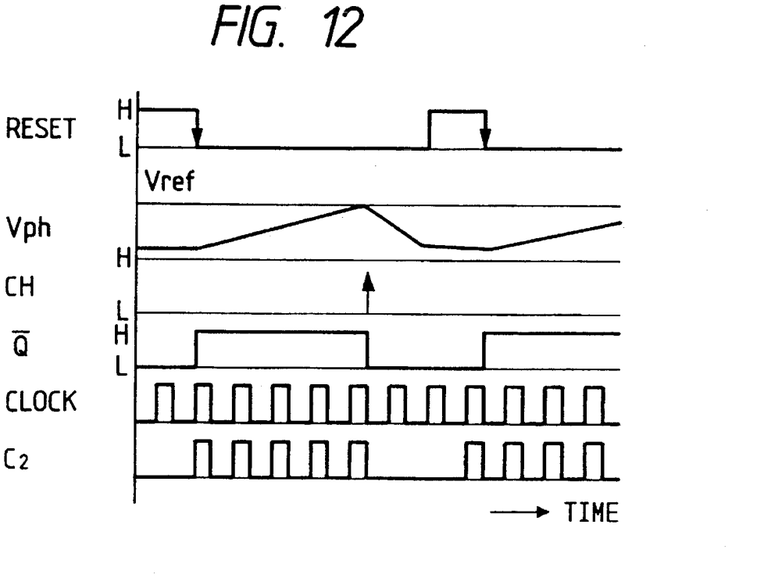
FIG. 12 is a time-domain diagram of various signals in the light receiving circuit of FIG. 11.

The light receiving circuit 10B operates as follows. When the start pulse signal changes from a low level to a high level, the $\overline{Q}$ output signal of the flip-flop 27 assumes a low level. The low-to-high change of the start pulse signal travels to the counter 6 via the OR gate 29 so that the counter 6 is reset. The low-level $\overline{Q}$ signal from the flip-flop 27 closes the AND gate 4 so that, as shown in FIG. 12, the output signal C2 of the AND gate 4 assumes a low level. The inverter 30 outputs a high-level signal to the transistor 2 in response to the low-level $\overline{Q}$ signal from the flip-flop 27. The high-level signal from the inverter 30 makes conductive the collector-emitter path of the transistor 2 so that the anode of the photodiode 1 is short-circuited or shunted to the ground and charges generated by the photodiode 1 disappear. Thus, as shown in FIG. 12, the voltage Vph at the anode of the photodiode 1 is decreased to substantially zero in response to the high-level signal outputted from the inverter 30.

After the start pulse signal changes to the high level, the reset pulse signal changes from a low level to a high level. In this case, the flip-flop 27 does not respond to the low-to-high change of the reset pulse signal.

The device 3 compares the voltage Vph at the anode of the photodiode 1 with the reference voltage Vref, and outputs a signal CH depending on whether or not the voltage Vph is lower than the reference voltage Vref. Specifically, the output signal CH of the comparator 3 assumes a low level when the voltage Vph is lower than the reference voltage Vref. The comparator output signal CH assumes a high level when the voltage Vph is equal to or higher than the reference voltage Vref.

In the presence of a high-level pulse of the reset pulse signal, the voltage Vph at the anode of the photodiode 1 is decreased to and held at substantially zero as previously described so that the voltage Vph is lower than the reference voltage Vref. Accordingly, the comparator 3 outputs a low-level signal CH as shown in FIG. 12.

When the reset pulse signal changes from the high level to a low level, the $\overline{Q}$ output signal of the flip-flop 27 assumes a high level and therefore the collector-emitter path of the transistor 2 goes non-conductive so that the voltage Vph at the anode of the photodiode 1 starts to increase from substantially zero as shown in FIG. 12. The rate of the increase in the voltage Vph depends on the intensity of light applied to the photodiode 1. It is thought that a stray capacitor or a parasitic capacitor connected to the photodiode 1 causes a time-dependent increase in the voltage Vph. While the $\overline{Q}$ output signal of the flip-flop 27 remains at the high level, the voltage Vph at the anode of the photodiode 1 continues to increase at the rate depending on the intensity of the applied light.

The high-level $\overline{Q}$ signal from the flip-flop 27 opens the AND gate 4 so that pulses in the clock pulse signal start to pass through the AND gate 4 and then reach the counter 6 as shown by the waveform C2 in FIG. 12. While the $\overline{Q}$ output signal of the flip-flop 27 remains at the high level, pulses in the clock pulse signal continue to pass through the AND gate 4. The device 6 counts up received pulses in the clock pulse signal.

When the voltage Vph at the anode of the photodiode 1 reaches the reference voltage Vref, the output signal CH of the comparator 3 changes from the low level to the high level as shown in FIG. 12. The $\overline{Q}$ output signal of the flip-flop 27 changes from the high level to the low level in response to the low-to-high change of the output signal CH of the comparator 3. The low-level $\overline{Q}$ signal from the flip-flop 27 closes the AND gate 4, inhibiting the transmission of pulses in the clock pulse signal to the counter 6. In addition, the memory 7 samples and holds the output signal of the counter 6 in response to the low-to-high change of the output signal CH of the comparator 3. The level change of the $\overline{Q}$ output signal of the flip-flop 27 is propagated to the counter 6 via the delay circuit 28 and the OR gate 29 while undergoing a given delay of time. The propagated level change resets the counter 6. As a result, the resetting of the counter 6 follows the sampling of the counter output signal by the memory 7 and the closing operation of the AND gate 4. The delay time provided by the delay circuit 28 determines the difference in timing between the resetting of the counter 6 and the sapling of the counter output signal (or the closing operation of the AND gate 4).

While the $\overline{Q}$ output signal of the flip-flop 27 remains at the low level, the transmission of pulses to the counter 6 continues to be inhibited as shown by the waveibrm C2 in FIG. 12. In addition, the low-level $\overline{Q}$ signal from the flip-flop 27 makes conductive the collector-emitter path of the transistor 2 so that the anode of the photodiode 1 is short-circuited or shunted to the ground. Accordingly, the voltage Vph at the anode of the photodiode 1 decreases to substantially zero.

As understood from the previous description, the number of pulses counted by the counter 6 depends on the interval of time during which the voltage Vph at the anode of the photodiode 1 increases from substantially zero to the reference voltage Vref. The counter 6 outputs a digital signal representing the number of counted pulses. Since the interval of time during which the voltage Vph increases from substantially zero to the reference voltage Vref depends on the rate of the increase in the voltage Vph, the output signal of the counter 6 represents the rate of the increase in the voltage Vph, that is, the intensity of the applied light. The output signal of the counter 6 which represents the intensity of the applied light is stored into the memory 7 at a timing immediately before the counter 6 is reset. Then, the signal is transmitted from the memory 7 to an output signal line 91 (see FIG. 1) via the vertical switch 12 and a horizontal switch 15 (see FIG. 1) at a suitable timing.

If a high-to-low change of the reset pulse signal occurs during an increase in the voltage Vph from substantially zero to the reference voltage Vref, the flip-flop 27 does not respond to the high-to-low change of the reset pulse signal so that the $\overline{Q}$ output signal of the flip-flop 27 remains at the high level.

In the light receiving circuit 10B, the counter output signal is sampled by and written into the memory 7 to update the signal in the memory 7 every time the voltage Vph have just reached the reference voltage Vref. Then, the signal is read out and transferred from the memory 7. Accordingly, the signal writing into the memory 7 and the signal readout from the memory 7 are executed periodically. The timing of the updating of the signal in the memory 7 (the signal writing into the memory 7) varies from light receiving circuit to light receiving circuit. Similarly to the embodiment of FIGS. 5–10, the period of sampling of the counter output signal decreases as the intensity of the applied light increases.

A prior-art memory-cell accessing technique for a DRAM may be used in sequentially reading out the signals from the memories 7 in an order determined by a scanning format.

It should be noted that the photodiode 1 in each light receiving circuit 10B may be replaced by a combination of a photodiode 1A, a resistor 8, and a capacitor 9 as in the embodiment of FIG. 4.

It should be noted that, in each of the light receiving circuits 10B, the photodiode 1 may be reversely connected to the transistor 2 and the comparator 3. In this case, the anode of the photodiode 1 is grounded, and the cathode of the photodiode 1 is connected to the collector of the transistor 2 and the comparator 3.

What is claimed is:

1. A solid-state image taking apparatus comprising:

a photodiode converting incident light into a corresponding signal voltage;

a reset switch connected to the photodiode for removing charges generated by the photodiode;

a comparator ibr comparing the signal voltage with a predetermined reference voltage, and generating a comparison-resultant signal which assumes a high level when the signal voltage is lower than the reference voltage;

a first AND circuit receiving the comparison-resultant signal and a clock pulse signal;

a second AND circuit receiving a reset pulse signal and an output signal of the first AND circuit; and a counter which counts up pulses in an output signal of the second AND circuit.

2. The solid-state image taking apparatus of claim 1, further comprising means for varying an interval between adjacent pulses in the clock pulse signal as a function of a time elapsed since a moment of an occurrence of a pulse of the reset pulse signal.

3. The solid-state image taking apparatus of claim 2, further comprising means for varying an interval $\delta T$ between adjacent pulses in the clock pulse signal as a function of a time elapsed T since a moment of an occurrence of a pulse of the reset pulse signal, the function being expressed as $\delta T = cT^d$ where "c" and "d" denote predetermined constats respectively.

4. The solid-state image taking apparatus of claim 1, further comprising means tbr varying the reference voltage as a function of a time elapsed since a moment of an occurrence of a pulse of the reset pulse signal.

5. A solid-state image taking apparatus comprising:

a photodiode converting incident light into a corresponding signal voltage;

means for measuring a time until the signal voltage reaches a predetermined reference voltage;

wherein the measuring means comprises means for generating a clock pulse signal, a comparator ibr comparing the signal voltage with the reference voltage and generating a comparison-resultant signal which represents a result of the comparing, a counter which counts up pulses of the clock pulse signal in response to the comparison-resultant signal; and a memory storing an output signal of the counter.

6. The solid-state image taking apparatus of claim 3, further comprising a second photodiode, and a second memory related to the second photodiode, and wherein the memories store output signals of counters at timings independent of each other respectively.

7. A solid-state image taking apparatus comprising:

a plurality of photodiodes converting incident light into corresponding signal voltages respectively;

a plurality of means connected to the photodiodes for measuring times until the signal voltages reach predetermined reference voltages respectively;

wherein each of the measuring means comprises means for generating a clock pulse signal, a comparator for comparing the signal voltage with the reference voltage and generating a comparison-resultant signal which represents a result of the comparing, a counter which counts up pulses of the clock pulse signal in response to the comparison-resultant signal; and a plurality of memories storing output signals of the counters respectively.

8. A solid-state image taking apparatus comprising:

a photodiode converting incident light into a corresponding signal voltage;

a reset switch connected to the photodiode for removing charges generated by the photodiode;

a first comparator ibr comparing the signal voltage with a predetermined first reference voltage, and generating a first comparison-resultant signal which assumes a high level when the signal voltage is lower than the first reference voltage;

a second comparator for comparing the signal voltage with a predetermined second reference voltage lower than the first reference voltage, and generating a second comparison-resultant signal which assumes a high level when the signal voltage is lower than the second reference voltage;

a flip-flop circuit responding to the first and second comparison-resultant signals;

a first OR circuit receiving a reset pulse signal and the first comparison-resultant signal;

a second OR circuit receiving the reset pulse signal and an output signal of the flip-flop circuit;

an AND circuit receiving an output signal of the second OR circuit and a clock pulse signal;

a counter which counts up pulses in an output signal of the AND circuit in response to an output signal of the first OR circuit; and a memory storing an output signal of the counter.

9. A solid-state image taking apparatus comprising:

a photodiode converting incident light into a corresponding signal voltage;

a reset switch connected to the photodiode for removing charges generated by the photodiode;

a comparator ibr comparing the signal voltage with a predetermined reference voltage, and generating a comparison-resultant signal which assumes a high level when the signal voltage is lower than the reference voltage;

a flip-flop circuit responding to the comparison-resultant signal, a start pulse signal, and a reset pulse signal;

an AND circuit receiving an output signal of the flip-flop circuit and a clock pulse signal;

a delay circuit for delaying the output signal of the flip-flop circuit;

an OR circuit receiving the start pulse signal and an output signal of the delay circuit;

a counter which counts up pulses in an output signal of the AND circuit in response to an output signal of the OR circuit; and a memory storing an output signal of the counter.

10. The solid-state image taking apparatus of claim 1, wherein the photodiode comprises an electric power source.

11. A solid-state image taking apparatus comprising:

a photodiode converting incident light into a corresponding electric current;

a resistor connected to the photodiode;

a capacitor connected to the resistor and being charged by the electric current from the photodiode via the resistor;

a reset switch connected to the capacitor for removing charges from the capacitor;

a comparator for comparing a signal voltage at the capacitor with a predetermined reference voltage, and generating a comparison-resultant signal which assumes a high level when the signal voltage is lower than the reference voltage;

a first AND circuit receiving the comparison-resultant signal and a clock pulse signal;

means for generating a reset pulse signal;

a second AND circuit receiving the reset pulse signal and an output signal of the first AND circuit; and a counter which counts up pulses in an output signal of the second AND circuit.

12. A solid-state image taking apparatus comprising:

a photodiode converting incident light into a corresponding electric current;

a resistor connected to the photodiode;

a capacitor connected to the resistor and being charged by the electric current from the photodiode via the resistor;

a reset switch connected to the capacitor for removing charges from the capacitor;

a first comparator for comparing a signal voltage at the capacitor with a predetermined first reference voltage, and generating a first comparison-resultant signal which assumes a high level when the signal voltage is lower than the first reference voltage;

a second comparator for comparing the signal voltage with a predetermined second reference voltage lower than the first reference voltage, and generating a second comparison-resultant signal which assumes a high level when the signal voltage is lower than the second reference voltage;

a flip-flop circuit responding to the first and second comparison-resultant signals;

a first OR circuit receiving a reset pulse signal and the first comparison-resultant signal;

a second OR circuit receiving the reset pulse signal and an output signal of the flip-flop circuit;

an AND circuit receiving an output signal of the second OR circuit and a clock pulse signal;

a counter which counts up pulses in an output signal of the AND circuit in response to an output signal of the first OR circuit; and a memory storing an output signal of the counter.

13. A solid-state image taking apparatus comprising:

a photodiode converting incident light into a corresponding electric current;

a resistor connected to the photodiode;

a capacitor connected to the resistor and being charged by the electric current from the photodiode via the resistor;

a reset switch connected to the capacitor for removing charges from the capacitor;

a comparator for comparing a signal voltage at the capacitor with a predetermined reference voltage, and generating a comparison-resultant signal which assumes a high level when the signal voltage is lower than the reference voltage;

a flip-flop circuit responding to the comparison-resultant signal, a start pulse signal, and a reset pulse signal;

an AND circuit receiving an output signal of the flip-flop circuit and a clock pulse signal;

a delay circuit for delaying the output signal of the flip-flop circuit;

an OR circuit receiving the start pulse signal and an output signal of the delay circuit;

a counter which counts up pulses in an output signal of the AND circuit in response to an output signal of the OR circuit; and a memory storing an output signal of the counter.

\* \* \* \* \*